United States Patent [19]
Farahani et al.

[11] Patent Number: 5,116,131
[45] Date of Patent: May 26, 1992

[54] MIRROR TRANSDUCER ASSEMBLY FOR RING LASER GYROSCOPES

[75] Inventors: Shahrokh R. Farahani, Moorpark; Mohammad M. Tehrani, Westlake Village, both of Calif.

[73] Assignee: Litton Systems, Inc., Beverly Hills, Calif.

[21] Appl. No.: 510,976

[22] Filed: Apr. 19, 1990

[51] Int. Cl.$^5$ .............................................. G01C 19/66
[52] U.S. Cl. ................................... 356/350; 372/107; 310/332
[58] Field of Search ................. 356/350; 372/107, 94; 310/332, 369

[56] References Cited

U.S. PATENT DOCUMENTS

| | | | |
|---|---|---|---|
| 2,037,455 | 9/1980 | Ljung | 356/350 |
| 4,691,323 | 9/1987 | Ljung | 356/350 |
| 4,824,253 | 4/1989 | Butler | 356/350 |
| 4,836,677 | 6/1989 | Doran et al. | 356/350 |
| 4,861,161 | 8/1989 | Ljung | 356/350 |
| 4,915,492 | 4/1990 | Toth | 310/332 |
| 4,933,592 | 6/1990 | Priddy | 310/332 |

FOREIGN PATENT DOCUMENTS

| | | |
|---|---|---|
| 0331581 | 9/1989 | European Pat. Off. |
| 8503568 | 8/1985 | PCT Int'l Appl. ................. 356/350 |

Primary Examiner—Samuel A. Turner
Attorney, Agent, or Firm—L. David Rish; M. Michael Carpenter

[57] ABSTRACT

Disclosed herein is a Pathlength Control Assembly for Ring Laser Gyroscope comprising, in a preferred embodiment, a mirror, coupled to a mirror housing including a mirror post, wherein the mirror is mounted on (or is an integral part of) an axially deflectable membrane of the housing. A pair of piezoelectric transducers are responsive to an electronic input signal and mounted to a backing plate. The transducers sandwich the backing plate and deform the backing plate to drive the mirror post to axially deflect said membrane. In this manner, the backing plate serves a dual function to both support the piezoelectric elements and drive the mirror post.

13 Claims, 3 Drawing Sheets

MIRROR TRANSDUCER ASSEMBLY FOR RING LASER GYROSCOPES

BACKGROUND OF THE INVENTION

1. Field of the Invention

This invention relates to a pathlength controller for a ring laser gyroscope and, more particularly, to an improved and simplified pathlength control assembly.

2. Description of Related Art

The Ring Laser Gyroscope has been developed as a logical replacement for the mechanical inertial gyroscope. Based upon the principles of the Sagnac Effect, ideally the ring laser gyroscope has minimal moving parts allowing extremely accurate rotational sensing. As originally envisioned, the ring laser gyroscope has at least two counter-propagating electromagnetic waves (such as light) which oscillate within an optical ring cavity. When the ideal ring laser gyroscope is stationary, no rotation is indicated by the sensor. As the ring cavity of the laser gyroscope is rotated about its central axis, the counter-propagating waves develop a beat frequency. Well above a characteristic lock-in zone a linear relationship between the beat frequency and the rotation rate of the gyroscope with respect to the inertial frame of reference may be established.

The working ring laser gyroscope requires various adjusting mechanisms to approach the ideal linear relationship between the beat frequency and the rotation rate of the gyroscope. Although the ideal ring laser gyroscope is characterized by a beat note proportional to the rotational rate, the two mode planar ring laser gyroscope requires rate biasing or mechanical dithering to prevent counter propagating waves from locking at low rotation rates. Mode locking is a major difficulty at low rotation rates where the ring laser gyroscope produces a false indication that the device is not rotating. If the rotation rate of a ring laser gyroscope starts at a value above that of where lock-in occurs, and is then decreased, the frequency difference between the beams disappears at a certain input rotation. Lock-in arises from the coupling of light between the beams. An effective means of overcoming the lock-in effect of the counter-propagating modes of light within a two mode gyroscope is to mechanically dither the mirrors or body of the gyroscope.

Additionally, the optical pathlength of the gyroscope must be controlled and monitored to make certain that the resonant cavity operates at the center of the atomic spectra gain curve. Due to the multiplicity of their applications, ring laser gyroscopes are required to operate over a wide temperature range, such as −55° C. to +75° C. Since the laser light beam emitted by the active gain region of the gyroscope propagates around the ring laser by means of reflection off the surfaces of at least 3 mirrors, thermal expansion of the frame will cause a significant change in cavity resonant wavelength. It is therefore necessary to provide a pathlength control mechanism to slightly vary the optical pathlength of the gyroscope ring resonator in order to preserve the fundamental resonance of the cavity to which all sensing instrument components of the gyroscope are calibrated.

Even where low expansive glass materials are used for building a monolithic frame which supports the optical cavity path between the mirrors, the pathlength of a ring laser gyroscope will still experience a substantial change in path length during temperature changes. This change can be as much as 5 wavelength or more at the resonant frequency of the light produced by the gaseous active medium, such as a helium-neon mix. In an active path length control system, the changes in path length due to thermal expansions and contractions are monitored by detector electronics and provide feedback information for driving one or more piezoelectric transducers.

Another important function of the pathlength control assembly is to maintain the resonant frequency of the ring laser cavity at the peak or center of the inhomogeneous line of the gain medium. It is well known to persons skilled in the art that the dispersive effects caused by the departure of the resonant frequency from the peak of the gain curve result in the two counter propagating beams experience different indices of refraction, and consequently different optical pathlengths which leads to a false gyro output, i.e., bias. Furthermore, the bias, besides being temperature dependent, is highly erratic as its magnitude changes with the uncontrolled offset between the cavity resonant frequency and the gain line center.

With reference to prior art FIGS. 1A and 1B, preserving the optical pathlength means that the gain center line 12 of the atomic spectra resonant gain profile 10 should be centered with the curve at a point of maximum intensity. In order to preserve this setting during a variety of temperatures, piezo-electric transducer driven mirror assemblies 16 and 18 are electrically actuated to move axially as shown in FIG. 1A to compensate for changes in the pathlength of the ring laser optical path 20. Light intensity detectors 22 and 24 are positioned at either of the fixed mirrors 26 and 28 to sense rotation. Each of the transducer driven mirror assemblies 16 and 18 include piezoelectric actuators attached to a flexible annular surface or driver in order to accomplish the axial deflection of reflecting surfaces thereon.

Heretofore, various schemes for pathlength control assemblies such as assemblies 16 and 18 of FIG. 1A have been suggested. Among the designs for pathlength controllers are those included in U.S. Pat. No. 4,824,253 issued Apr. 25, 1989 to Butler (owned by the common assignee of this application); U.S. Pat. No. 4,861,161 issued Aug. 29, 1989 to Ljung; U.S. Pat. No. 4,691,323 issued Sep. 1, 1987 to Ljung; and UK Application GB 2,037,455 published Jul. 9, 1980, inventors Ljung and Williams. U.S. Pat. No. 4,861,161 to Ljung teaches a particular technique in the design of PLC assembly to minimize the mirror tilt.

In particular, attention is drawn to FIG. 2 as an example of the complex structure of a PRIOR ART pathlength control assembly. A path length controller mirror assembly 30 is shown generally to include a membrane-type mirror housing 38 which supports the mirror 44, which mirror is positioned facing into the gyroscope frame 40 for reflecting light within the optical path off of its surface. The housing 38 has an outer cylinder 34 and a central mirror post 36. The annular surface 48 of the mirror post 36 and the outer annular surface 52 of the housing 38 are flush against the circular backing plate 32. The circular backing plate 32 is sandwiched between the mirror housing 38 and the driver body 50. The driver body includes a driver post 54, which during activation of the cavity length control assembly causes the driver post surface 56 to move axially along the direction shown at 42. Such axial movement of the driver post 54 causes axial movement by the mirror post 36 against the flexible mirror membrane 46, thereby allowing axial movement of the mirror 44 between a rest position and a flexural position 44' (shown in phantom). The driver body 50 has an outer surface 58 which is flush against the backside of the backing plate 32.

Positioned on either side of the back end of the driver body 50 are two piezo-electric elements 60 and 62. These elements are often bimetallic or bimorphic, such that when they are alternatively polarized by applying a voltage thereto through electrical terminals 64 and 66, the driver body 50 and driver post 54 move axially along the central axis of the driver body 50, back and forth as needed in the axial direction 42. Such movement results in positioning the backing plate to a new position 68, and moving the diaphragm membrane 46 of the mirror housing 38 to a new position 72, all of which results in the desired axial movement 42 of the mirror surface 44 out to 44'. It will be noted that in the prior art FIG. 2, a relatively complex structure, including a separate driver body 50, was needed to achieve a proper and balanced pathlength control assembly. Such a structural complexity was dictated by the need to drive the mirror 44 in one axial direction 42, while the driver 50 would not act to destabilize the dynamic symmetry of the assembly 30. Certainly, the more complex that a pathlength controller is, the more costly becomes the gyroscope design and fabrication.

SUMMARY OF THE INVENTION

What is needed is a simplified approach to making pathlength controller assemblies, which includes fewer parts than that required in prior art pathlength controllers, yet with no sacrifice of performance. Disclosed herein is such a pathlength controller assembly for ring laser gyroscopes which includes a mirror mounted on (or is an integral part of) a mirror housing, where the housing includes an axially deflectable membrane. The mirror housing also has a mirror post coupled to its deflectable membrane. The mirror housing is positioned flush with a backing plate. The backing plate will have affixed to it at least one transducer, mounted to and supported by the backing plate, for axially deflecting the backing plate in response to an electronic input signal. In this manner the backing plate acts to support the piezo-electric transducer elements and the mirror housing, while at the same time the backing plate also acts to drive the membrane and the reflecting mirror through the mirror post. Thus, the backing plate serves the dual functions of supporting the transducers and axially driving the mirror post. Due to bimorphic effect of piezo-electric elements.

The transducer elements generally comprise a pair of transducers, a first transducer which is a flat bimorphic disc supported on one side of said backing plate, and a second transducer which is a flat bimorphic ring defining a central aperture. In this way, the central aperture of the second transducer allows the mirror post of the mirror housing to be inserted against one side of the backing plate, while the other side of the backing plate supports the first transducer. The concentricity of the first and second transducers with respect to the mirror post minimize the tilt of the path length control assembly.

DETAILED DESCRIPTION OF THE PREFERRED EMBODIMENT

Figure 3:
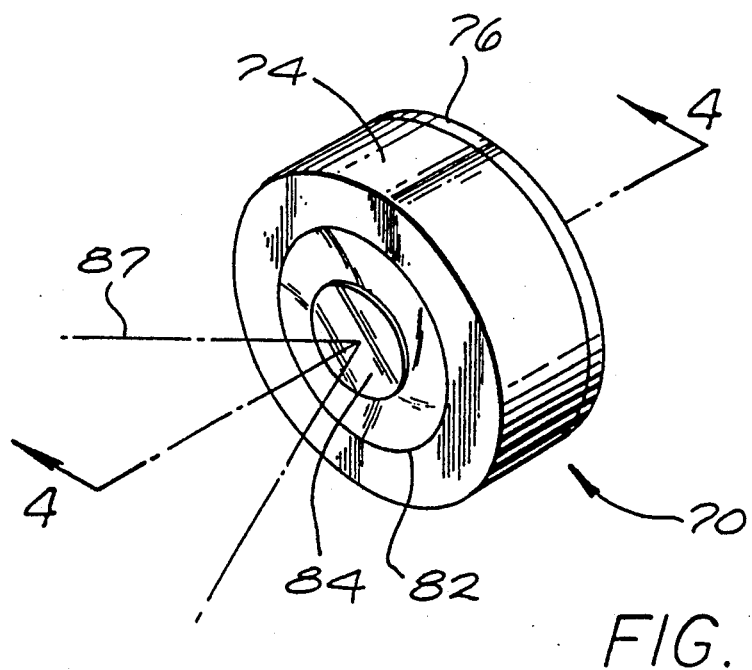
FIG. 3 is a perspective isometric view of a preferred embodiment of the pathlength control assembly for ring laser gyroscopes of this invention.

With reference to FIG. 3, a pathlength control assembly is shown positioned at one of the three or four corners of a ring laser gyroscope. A mirror surface 84 is shown reflecting light along an optical path 87. The reflective surface is mounted on a mirror membrane 82, which membrane 82 forms the forward surface of the mirror housing 74. The dual function backing plate and driver 76 is shown positioned at the back end of the mirror housing 74.

Figure 4:
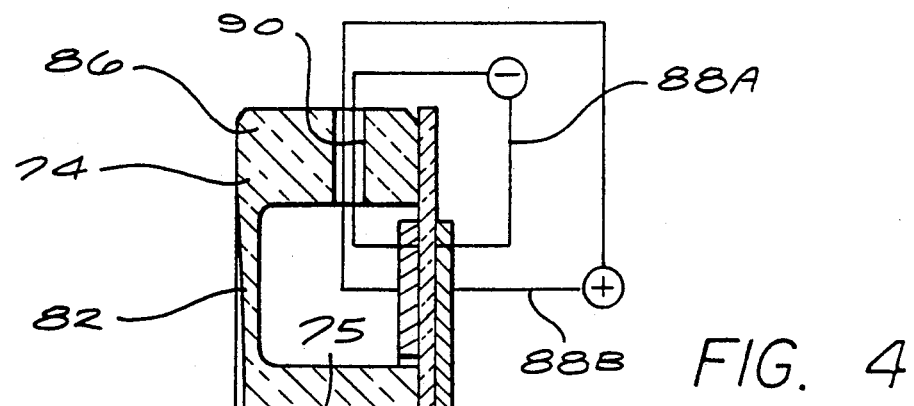
FIG. 4 is a cross-section view of the pathlength control assembly of this invention, taken along line 4—4 of FIG. 3.
Figure 5:
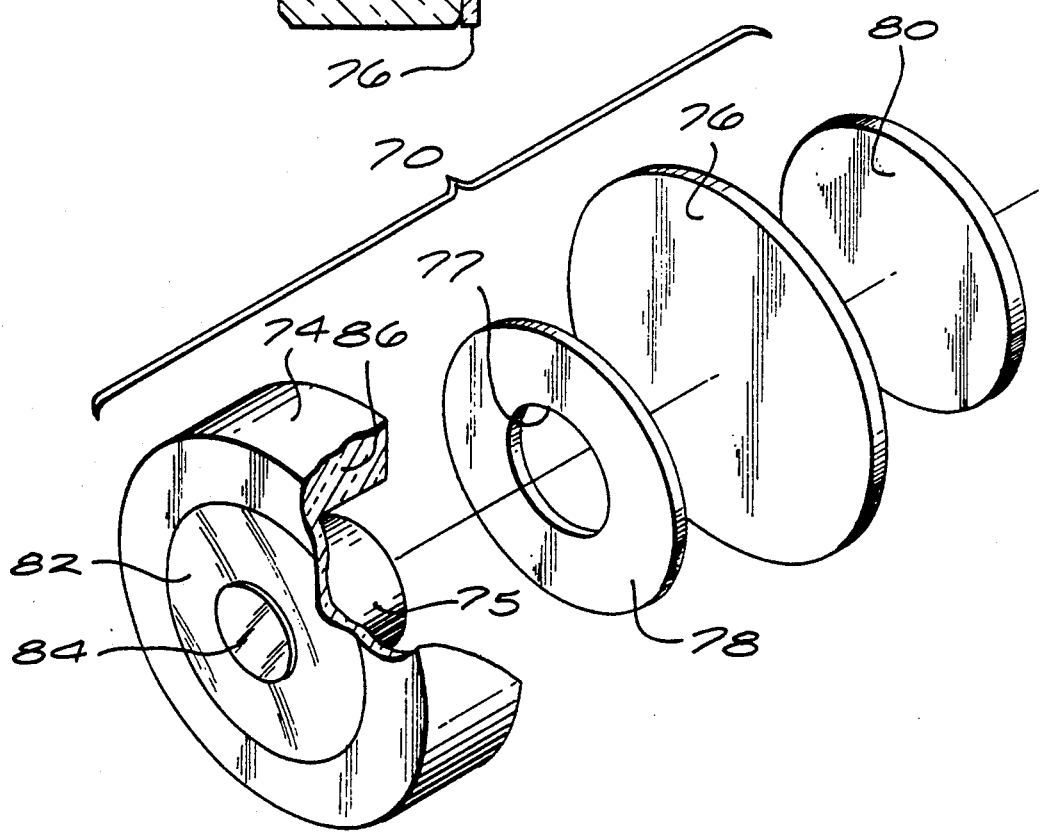
FIG. 5 is an exploded isometric view of the device of FIG. 3.

A more detailed view of the components comprising the pathlength control assembly of this invention can be comprehended with reference to FIGS. 4 and 5. It can be seen that the basic components of the pathlength control assembly 70 include a mirror housing 74 and a backing plate 76, which serves in the dual capacity as a driver and which is sandwiched between the piezo-electric elements 78 and 80. The piezo-electric element 78 has an inner annulus 77 to accommodate placement of the mirror post 75 of the mirror housing 74. The piezoelectric elements 78 and 80 are secured and bonded to the front and back surfaces, respectively, of backing plate and driver 76 by the use of epoxy cement.

The mirror housing 74 include a forward surface which supports the mirror surface 84 and acts as a membrane surface 82. The membrane surface 82 also acts as a mirror substrate for the mirror surface 84. The mirror housing 74 has an outer cylinder 86 which provide symmetry and balance to the pathlength control assembly 70.

Preferably, except for the piezo-elements 78 and 80, all the components which make up the assembly 70 (like the mirror housing 74 and the backing plate and driver 76) should be made from the same material to decrease the effects of differential thermal expansion. Materials of relatively low thermal expansion coefficients such as Cervit, Zerodur, ULE (Ultra Low Expansion) Glass are among the most desirable to use to manufacture the pathlength control assembly 70. In this manner, the assembly 70 is able to operate over a wide temperature range from $-55°$ C. through at least $+75°$ C.

Figure 2:
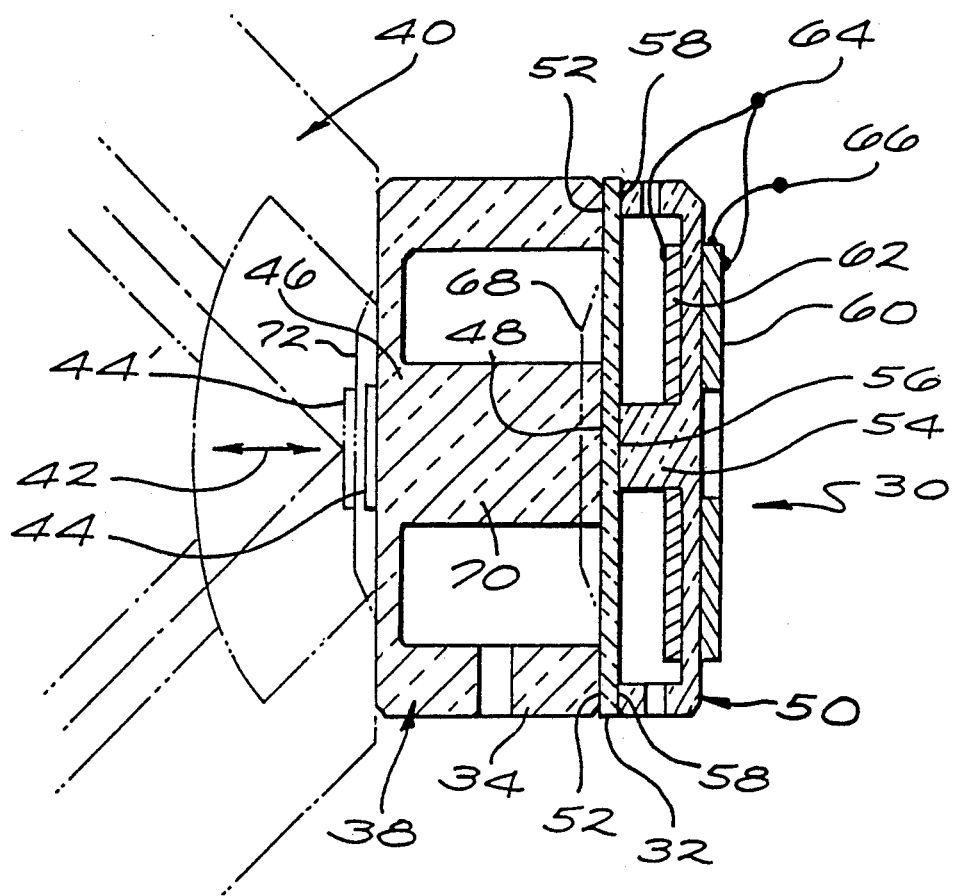
FIG. 2 is a PRIOR ART drawing of a cross-section of a pathlength control assembly.

In operation, an electrical stimulus is provided as shown along the electrical wiring 88A and 88B. One will note that the piezo elements 78 and 80 are charged in such a way that the two inner surfaces closest to the backing plate acquire like (say, negative) charges and, at the same time, the outer surfaces of elements 78 and 80 acquire like changes of the opposite sigh (i.e., positive). Thus, when they are voltage activated, the piezo-electric elements 78 and 80 tend to bow in an axial direction along the central axis of the pathlength control assembly 70 (Line 4—4 of FIG. 3). The piezo-elements then cause the backing plate to bow and move the mirror post 75 in an axial direction. A vent hole 90 is provided to allow pressure equalization within the pathlength control assembly 70 and to also allow passage of the wiring 88A and 88B from the piezo-elements 78 and 80 from the inside of the housing 74 to the outer surface for electrical connection outside the assembly 70. It should be noted that only a single vent hole through the mirror housing 74 is needed to accomplish the pressure equalization required, (when the mirror membrane 82 moves in and out along the axial direction of the assembly 70), while the prior art design, as illustrated in FIG. 2, requires at least a pair of pressure equalized vent holes on either side of the driver body 50.

Movement of the mirror post 75 of the mirror housing 74 causes the reflective mirror surface 84 to move back and forth along the central axis of the mirror assembly 70, thereby allowing active cavity or optical pathlength control to be accomplished. It shall be understood that heretofore an additional driver body 50 (of Prior Art FIG. 2) was need to accomplished the desired axial translation that the invention of this application accomplishes by using the backing plate 76 in a dual capacity such as a driver and piezo-element support plate. Such design allows a considerable cost savings due to the elimination of the driver body 50 component.

A particularly deleterious error source in the performance of any pathlength controller assembly is the mirror tilt, i.e., the mirror motion in directions other than its perpendicular axis. As it was heretofore taught in the art (i.e. U.S. Pat. No. 4,861,161 to Ljung), such mirror tilt can cause bias shifts in the ring laser gyroscope output under changing temperature.

Figure 1A:
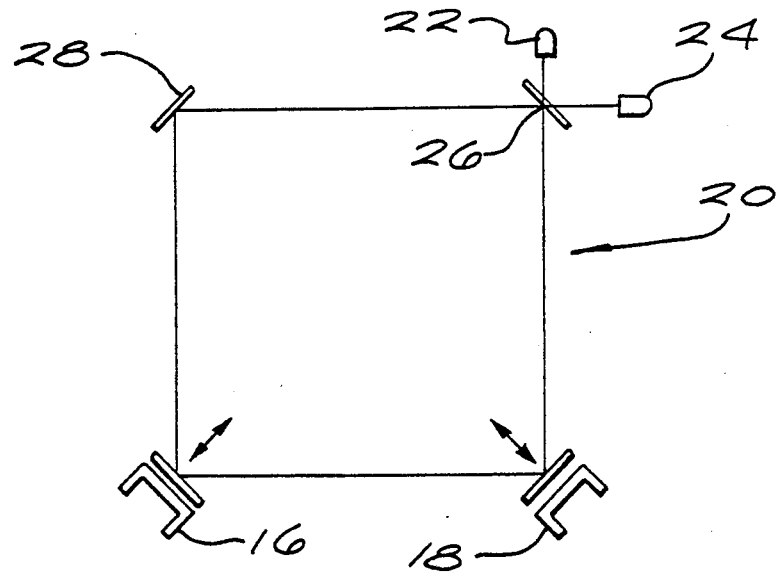
FIG. 1A is a PRIOR ART drawing showing a schematic view of the ring laser gyroscope instrument illustrating the operation of a cavity length control system.
Figure 1B:
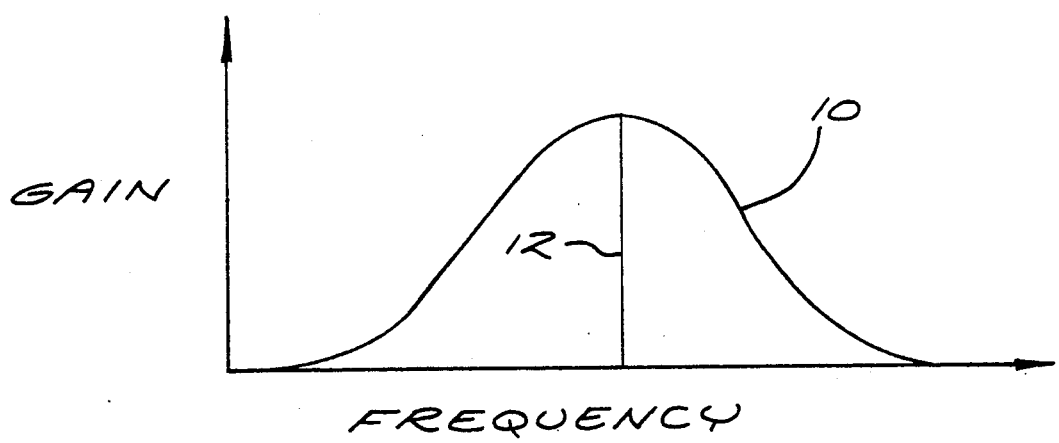
FIG. 1B is a PRIOR ART graphic representation illustrating the atomic gain medium curve of the gyroscope operating at the resonant frequency of a ring laser gyroscope.

An effective technique to test the pathlength control mirror assembly for mirror tilt is to perform a "mode scan". A mode scan comprises the application of full electrical voltage to the pathlength control piezo-electric elements 78 and 80, while simultaneously monitoring of the outputs of the light intensity detectors, such as detectors 22 and 24 of FIG. 1A. Under such a test, the pathlength control mirrors move through their maximum number of design modes, and a trace of the output signals from the photodetectors show a curve like the one depicted in FIG. 1B (the gain profile). Any changes in the maxima of the successive gain profiles under a mode scan would be indicative of mirror tilt. The Pathlength control assembly and mirror of this application have been tested for mirror tilt errors according the mode scan method as described heretofore. In a manner distinct from the teachings of the prior art (including U.S. Pat. No. 4,861,161), the pathlength control assembly of this application shows an inherent simplicity in comparison with previous designs. This simplicity of design (including the absence of any point contacts between its components) allowed the applicant's invention to test quite successfully with regard to mirror tilt. The inventors have built and tested a number of pathlength control assemblies according to the teachings of this disclosure. Two such assemblies were integrated into a ring laser gyroscope which underwent a variety of gyroscope performance tests, including the mode scan test for pathlength controller mirror tilt. The inventor's test results showed that over a scan of seven modes (which is within the design goal) there was no measurable change in the maxima of the gain profiles traced during the mode scan.

While preferred embodiments are shown, it is clear that alternative equivalent embodiments of the invention may be envisioned which provide adequate alternatives, performing similar functions to the preferred embodiment, yet using the basic teachings and principles of the herein described invention. For example, any symmetric shape for the mirror housing 74 would be suitable to achieve cavity length control provided there is a balanced distribution of forces across the face of the backing plate 76. Thus, alternate embodiments having substantially equivalent functions or structures are intended to be comprehended within the scope of the appended claims.

What is claimed is:

1. In a ring laser gyroscope, a mirror transducer assembly, comprising:
   a mirror mounted on a mirror housing, said mirror housing including a single axially deflectable membrane;
   a mirror post coupled to said deflectable membrane; and further consisting essentially of:
   a flat backing plate, positioned flush against said mirror post and said mirror housing, and;
   at least one piezo-electric transducer, bonded onto said backing plate, for axially deflecting said backing plate in response to an electronic input signal;
   said backing plate driving said mirror post, said membrane, and said mirror;
   whereby, said backing plate serves the dual functions of supporting said at least one transducer and axially driving said mirror post with minimal mirror tilt.

2. The ring laser gyroscope mirror transducer assembly of claim 1, wherein:
   said at least one transducer comprises two piezo-electric transducers,
   a first of said piezo-electric transducers being a flat bimorphic disc bonded to one side of said backing plate, and
   a second of said piezo-electric transducers being a flat bimorphic ring defining a central aperture into which said mirror post is inserted, said second transducer bonded to the other side of said backing plate.

3. The ring laser gyroscope mirror transducer assembly of claim 1, wherein:
   said at least one transducer comprises two piezo-electric transducers,
   a first of said piezo-electric transducers being a flat bimorphic ring defining a central aperture bonded to one side of said backing plate, and
   a second of said piezo-electric transducers being a flat bimorphic ring defining a central aperture of a size identical to the aperture of said first transducer into which said mirror post is inserted, said second transducer bonded to the other side of said backing plate.

4. The ring laser gyroscope mirror transducer assembly of claim 1, wherein:
   the mirror housing and the backing plate are made from a low temperature expansive material selected from the group consisting of cervit, zerodur, and ULE glass;

whereby, said mirror transducer assembly is able to operate over a wide temperature range.

5. An improved ring laser gyroscope, said ring laser gyroscope comprising:
   a resonant optical cavity formed in a ring configuration, said ring configuration defining a closed optical path;
   said resonant optical cavity having a pathlength control assembly for adjusting the optical path length in response to changes in said pathlength;
   said pathlength control assembly, further comprising:
   a mirror mounted on a mirror housing, said mirror housing including an axially deflectable membrane and having only one vent hole through which pressure equalization of the assembly may be accomplished;
   a mirror post coupled to said deflectable membrane;
   flat backing plate means for supporting at least one piezo-electric element and axially driving said mirror post;
   said at least one piezo-electric element, bonded onto said flat backing plate means, for axially deflecting said backing plate in response to an electronic input signal;
   said flat backing plate means driving said mirror post, said membrane, and said mirror;
   whereby, said flat backing plate means performs the dual functions of supporting said at least one piezo-electric element and axially driving said mirror post in a single flat element with minimal mirror tilt.

6. The ring laser gyroscope of claim 5, wherein said pathlength control assembly further comprises:
   said at least one piezo-electric element comprises two elements,
   a first of said elements being a flat bimorphic disc bonded to one side of said flat backing plate, and
   a second of said elements being a flat bimorphic ring defining a central aperture into which said mirror post is inserted, said second element bonded to the other side of said flat backing plate.

7. In a ring laser gyroscope, a mirror transducer assembly, comprising:
   a mirror;
   means for mounting said mirror on a single axially deflectable membrane;
   a mirror post coupled to said deflectable membrane;
   at least one piezo-electric transducer means;
   a relatively flat means for supporting said transducer means, positioned flush against said mirror post and said mirror mounting means, and axially driving said mirror post;
   said at least one transducer means, bonded onto said flat supporting and driving means, for axially deflecting said flat supporting and driving means in response to an electronic input signal;
   said flat supporting and driving means axially displacing said mirror post, said membrane, and said mirror;
   whereby, said flat supporting and driving means provides the dual functions of supporting said at least one transducer and axially driving said mirror post and mirror without undue mirror tilt.

8. The mirror transducer assembly claim 7, wherein:
   said flat means for supporting said transducer means and axially driving said mirror post comprises a single flat backing plate; and,
   said means for mounting said mirror on an axially deflectable membrane comprises a mirror housing.

9. The mirror transducer assembly claim 7, wherein:
   said at least one transducer means comprises two piezo-electric transducers,
   a first of said piezo-electric transducers being a flat bimorphic disc bonded to one side of said flat supporting and driving means, and
   a second of said piezo-electric transducers being a flat bimorphic ring defining a central aperture into which said mirror post is inserted, said second transducer bonded to the other side of said flat supporting and driving means.

10. In a ring laser gyroscope, a mirror transducer assembly, comprising:
    a mirror mounted on a mirror housing, said mirror housing including an axially deflectable membrane and having only one vent hole through which pressure equalization of the assembly may be accomplished;
    a mirror post coupled to said deflectable membrane; and further consisting essentially of:
    a flat backing plate and;
    at least one piezo-electric transducer, bonded onto said backing plate, for axially deflecting said backing plate in response to an electronic input signal;
    said backing plate driving said mirror post, said membrane, and said mirror;
    whereby, said backing plate serves the dual functions of supporting said at least one transducer and axially driving said mirror post with minimal mirror tilt.

11. The ring laser gyroscope mirror transducer assembly of claim 10, wherein:
    said at least one transducer comprises two piezo-electric transducers,
    a first of said piezo-electric transducers being a flat disc bonded to one side of said backing plate, and
    a second of said piezo-electric transducers being a flat ring defining a central aperture into which said mirror post is inserted, said second transducer bonded to the other side of said backing plate.

12. The ring laser gyroscope mirror transducer assembly of claim 10, wherein:
    said at least one transducer comprises two piezo-electric transducers,
    a first of said piezo-electric transducers being a flat ring defining a central aperture bonded to one side of said backing plate, and
    a second of said piezo-electric transducers being a flat ring defining a central aperture of a size identical to the aperture of said first transducer into which said mirror post is inserted, said second transducer bonded to the other side of said backing plate.

13. The ring laser gyroscope mirror transducer assembly of claim 10, wherein:
    the mirror housing and the backing plate are made from a low temperature expansive material selected from the group consisting of cervit, zerodur, and ULE glass;
    whereby, said mirror transducer assembly is able to operate over a wide temperature range.

* * * * *